G. RUBINO.
RIM FOR PNEUMATIC TIRED WHEELS.
APPLICATION FILED JUNE 11, 1919.

1,346,468. Patented July 13, 1920.

Inventor:-
Giuseppe Rubino,
By:- B. Singer

UNITED STATES PATENT OFFICE.

GIUSEPPE RUBINO, OF TURIN, ITALY.

RIM FOR PNEUMATIC-TIRED WHEELS.

1,346,468.  Specification of Letters Patent.  Patented July 13, 1920.

Application filed June 11, 1919. Serial No. 303,522.

*To all whom it may concern:*

Be it known that I, GIUSEPPE RUBINO, a subject of the King of Italy, and resident of Barriesa, Crocetta, Turin, Italy, have invented certain new and useful Improvements in Rims for Pneumatic-Tired Wheels, of which the following is a full, clear, and exact specification.

This invention relates to a new form of sectional or separate rim for pneumatic tired wheels, designed to facilitate the mounting of an air-tube or cover therefor, or both.

Dismountable rims for pneumatic tired wheels used hitherto are somewhat complicated and have a seating for the pneumatic tire in the form of a C-shaped annular rim in a single piece, so that the application of a new air tube or cover cannot be rapid owing to the difficulty of introducing into the rim the thick part of the cover, a difficulty which often causes deformations and damage to the air tube.

By the present invention a metallic rim which retains the C-shape, is not made in a single piece but in two parts which one can easily separate so as to avoid completely the aforesaid difficulty.

Figure 1:
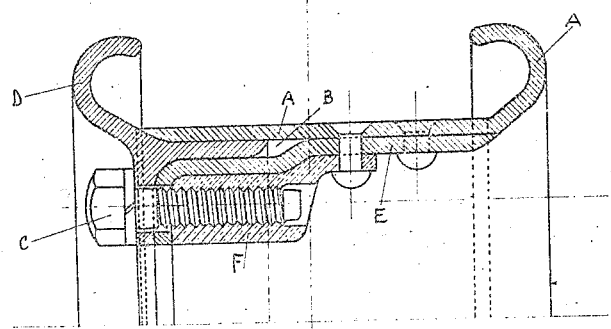
Figure 2:
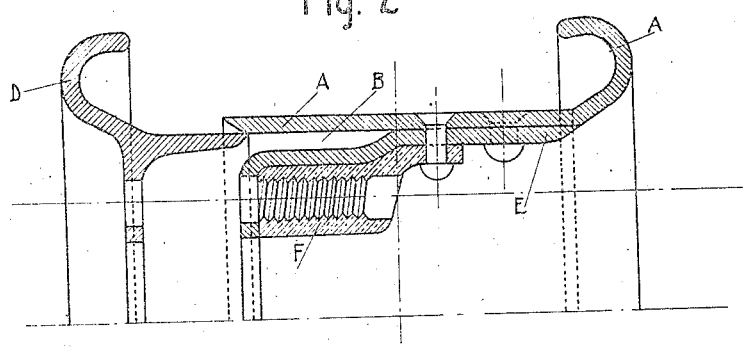

A construction in accordance with the invention is shown in the accompanying drawings, in which Figure 1 is a section through the rim in its closed position and Fig. 2 is a like view in the open position.

The rim consists of two parts suitably curved A and B. Part A is fixed to the rim E which is slightly stepped at its middle line so that there is formed between the part of the rim of smaller diameter and the part A of the rim a cylindrical space B in which the part D of the rim is adapted to slide.

At suitable distances apart the rim E has screw threaded brackets or lugs F which receive screw bolts C adapted to hold the part D of the rim in its operative relationship to part A.

By removing the bolts C the part D of the rim may be entirely removed and the cover and the air tube withdrawn from or mounted on the rim with great ease.

Having now particularly described and ascertained the nature of my invention and in what manner the same is to be performed, I declare that what I claim is:

A sectional rim comprising two members one having a tire engaging flange on one side and also having an inner ring, the said inner ring being spaced from said member at the side opposite said flange and being provided at said side with an internal flange, and said member being further provided with lugs secured to said inner ring and arranged in the angle between said inner ring and its inturned flange, said lugs and inturned flange having screw-receiving openings; the other member being telescopically fitted between the first named member and the spaced portion of its inner ring and being also provided with a tire engaging flange and an inwardly extending flange, and screws extending through openings in said inwardly extending flange and having threaded engagement in the openings of the said lugs.

In witness whereof, I have hereunto signed my name in the presence of two subscribing witnesses.

GIUSEPPE RUBINO.

Witnesses:
 ANDRES LUVNA,
 GIUSEPPE D. LEOS.